(No Model.)
W. BARRY.
RAKE.
No. 298,156. Patented May 6, 1884.
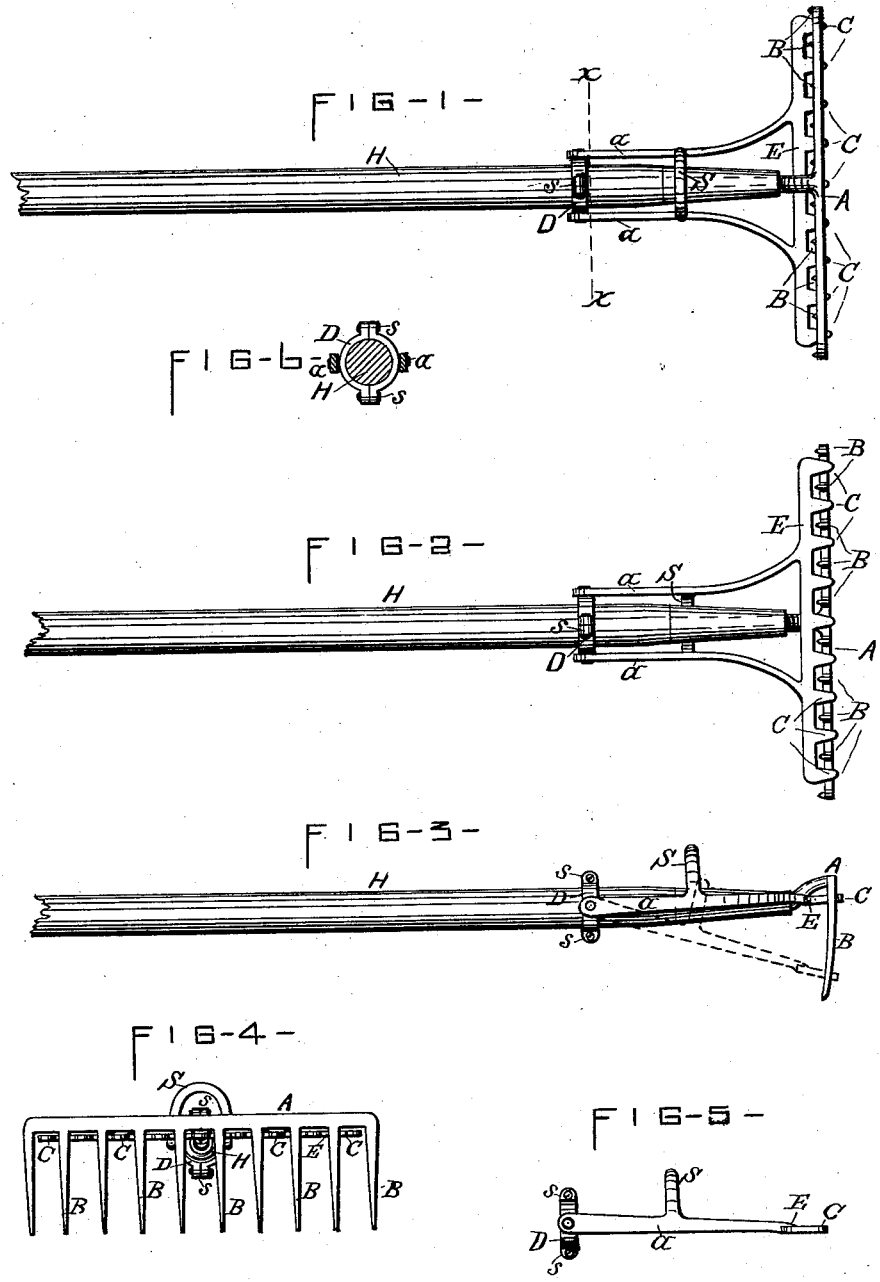

United States Patent Office.

WILLIAM BARRY, OF SYRACUSE, NEW YORK, ASSIGNOR TO THE WALES MANUFACTURING COMPANY, OF SAME PLACE.

RAKE.

SPECIFICATION forming part of Letters Patent No. 298,156, dated May 6, 1884.

Application filed September 13, 1883. (No model.)

*To all whom it may concern:*

Be it known that I, WILLIAM BARRY, of Syracuse, in the county of Onondaga, in the State of New York, have invented new and useful Improvements in Rakes, of which the following, taken in connection with the accompanying drawings, is a full, clear, and exact description.

This invention relates to improvements in clearing devices adapted for attachment to garden-rakes, whereby the teeth are prevented from becoming clogged in use, thereby obviating the necessity of removing obstructions by hand, as in the present case, when such rakes are used on leaves or weeds; and the object is the production of a simple and efficient device for this purpose, which can be readily applied to the rake and not liable to get out of order in case the rake-teeth become bent out of shape in use.

To this end the invention consists in a single bar arranged back of the rake-head, and having forwardly-projecting tapering clearing-fingers terminating in front of the head and moving freely vertically between the teeth. The bar is provided with rearward-extending arms projecting from each side of the center thereof, to brace the bar laterally, said arms being pivoted to a divided collar which clamps the device to the rake-handle. Intermediately of the length of the arms a yoke-shaped strap is spanned across and made integral with the side arms and the clearing-bar. The yoke serves to limit the downward throw of the clearing-bar. The attachment of the bar to the handle is made adjustable by means of the divided collar, and the tapering fingers, being disconnected from the teeth, effectually clear the same, and are not affected in their action in case the teeth become bent from contact with stones or roots, all as hereinafter more specifically described, and pointed out in the claim.

In specifying my invention reference is had to the accompanying drawings, forming a part of this specification, like letters indicating corresponding parts in all the views, in which—

Figure 1 is a plan view of a rake with my clearing-bar attached. Fig. 2 is an inverted view of the same. Fig. 3 shows a side view, the dotted lines indicating the clearing-bar at its lowest point. Fig. 4 is a front view, and shows the tapered fingers in position between the rake-teeth. Fig. 5 shows a detached view of the clearing-bar and its attachments, and Fig. 6 is a sectional view of the collar and its parts.

The letter E represents the clearing-bar, arranged back of the rake-head A. The bar E has forward-projecting tapering fingers C, which are interposed between the rake-teeth B, the broad part or base of the fingers coming or extending well back of the teeth, and the points terminating in front of the rake-head A. The bar E has rearwardly-extending side arms, $a$ $a$, projecting from opposite sides of the center of the bar, serving to brace the bar laterally, holding it securely in position against side play. The arms $a$ $a$ are pivoted to trunnions on the divided collar D, as best shown at Fig. 3, and serve also to attach the bar to the collar which clamps the device to the handle H.

Midway of the length of the arms $a$ $a$ is the yoke S, which spans over and across the handle H, and is rigidly connected to the side arms, $a$ $a$. The yoke forms a stop, which limits the downward movement or thrust of the bar E as it swings on the trunnions of the collar D. The bar E, its side arms, $a$ $a$, and yoke S are preferably cast in one piece. The clearing-teeth C swing freely between the rake-teeth B, and are tapered outwardly—that is, from the bar to the point or outer end of the finger—so as to present a broad surface at the base, narrowing to the point. This construction of the clearing-fingers permits the rake-teeth to bend or yield freely without interfering with or disturbing the action of the clearing bar and fingers, as is the case where the clearing devices now in use are employed. These prior devices consist of skeleton frames surrounding the teeth, and are either pivoted to the rake, so as to swing vertically, or the rake-head is pivoted so the teeth swing within the clearing-frame. In either case the frame surrounds the teeth, and when the teeth become bent they bear against the frame and clog the same. This difficulty also occurs where a wire clearer arranged zigzag around and between the teeth is employed. Furthermore, in these devices the main bar is connected by a single support to the rake, and becomes clogged by lateral strain. I overcome these difficulties by providing a single clearing-bar having the tapering fingers C and the side arms, *a a*, arranged as described.

The collar D is divided or made in two parts, as best shown at Fig. 6, and it embraces the handle H, to which it is clamped by screws *s s*. Trunnions are formed on each half of the collar, to which the side arms, *a a*, are pivoted. The collar D is thus adapted and forms an adjustable attachment for securing the clearing-bar to rake-handles of different sizes without changing or fitting the same to effect the attachment.

It will be observed that the bar E, with its tapered clearing-fingers, swings freely vertically between the rake-teeth, and cannot be affected by any bending or deviation of the teeth, and it does its work automatically in a simple and effective manner.

I am aware that skeleton cleaners and wire frames of the class previously described have been patented; but in each of these prior devices the teeth of the rake, when bent out of place, come in contact with and interfere with the action of the clearing-frames. Furthermore, these devices were attached to the handle and operated by springs, which caused the frame or rake-head to resume its normal position after pressure thereon had been removed, and these devices were not provided with means to automatically limit the downward throw of the clearing appliances. My device differs from these in the fact that the clearing-bar drops from gravity, and is automatic in action, and cannot become clogged by the teeth coming in contact with the clearing-fingers, as described, and the clearing-bar is sustained and braced from side play by the pivoted side arms.

Having thus fully described my invention, what I claim as new, and desire to secure by Letters Patent, is—

The bar E, provided with tapering clearing-fingers C and rearwardly-projecting arms *a a*, and the yoke S, connected to said arms, in combination with the divided collar D, said collar having trunnions for the attachment of the arms *a a*, as and for the purpose specified.

In testimony whereof I have hereunto signed my name and affixed my seal, in the presence of two attesting witnesses, at Syracuse, in the county of Onondaga, in the State of New York, this 25th day of August, 1883.

WILLIAM BARRY. [L. S.]

Witnesses:
FREDERICK H. GIBBS,
WM. C. RAYMOND.